United States Patent
Hsiung

Patent Number: 5,122,287
Date of Patent: Jun. 16, 1992

[54] FILTRATION SYSTEM

[76] Inventor: Andrew K. Hsiung, 2226 Songbird Ct. SE., Salem, Oreg. 97306

[21] Appl. No.: 604,823

[22] Filed: Oct. 26, 1990

[51] Int. Cl.$^5$ .................. B01D 24/00; B01D 24/46
[52] U.S. Cl. .................... 210/792; 210/767; 210/791; 210/807; 210/263; 210/269; 210/274; 210/275; 210/277; 210/279; 210/285
[58] Field of Search ............. 210/616, 617, 618, 767, 210/780, 786, 788, 791, 792, 807, 263, 264, 269, 274, 275, 277, 279, 284, 283, 285

[56] References Cited

U.S. PATENT DOCUMENTS

| | | | |
|---|---|---|---|
| 136,364 | 3/1873 | Conger | 210/264 |
| 3,122,594 | 2/1964 | Kielback | 261/94 |
| 3,925,202 | 12/1975 | Hirs | 201/32 |
| 4,021,339 | 5/1977 | Foody | 210/80 |
| 4,115,266 | 9/1978 | Ohshima | 210/80 |
| 4,309,292 | 1/1982 | Stannard et al. | 210/792 |
| 4,330,327 | 5/1982 | Pryor | 75/76 |
| 4,427,555 | 1/1984 | Brown et al. | 210/805 |
| 4,446,027 | 5/1984 | Simmers | 210/661 |
| 4,464,255 | 8/1984 | Ueda | 210/274 |
| 4,534,865 | 8/1985 | Sundberg et al. | 210/692 |
| 4,547,286 | 10/1985 | Hsiung | 210/738 |
| 4,608,181 | 8/1986 | Hsiung et al. | 210/786 |
| 4,670,150 | 6/1987 | Hsuing et al. | 210/636 |
| 4,743,382 | 5/1988 | Williamson et al. | 210/786 |

FOREIGN PATENT DOCUMENTS 1317433 4/1969 United Kingdom .

OTHER PUBLICATIONS

"Capture Mechanisms in Deep-bed Filtration", Joseph G. Selmeczi, *Industrial Water Engineering*, 4 pages, Jun./Jul. 1971.

Buoyant Media Filter, Kathleen W. Simmers, *Proceedings-40th International Water Conference*, Oct. 30, 31--Nov. 1, 1979, 4 pages.

The Trident system treatment technologies, *Waterworld News*, 2 pages, Sep./Oct. 1986.

*Primary Examiner*—Robert A. Dawson
*Assistant Examiner*—David Reifsnyder
*Attorney, Agent, or Firm*—Klarquist, Sparkman, Campbell, Leigh & Whinston

[57] ABSTRACT

The filtration system provides a long horizontal flow path through buoyant filter media. The filter media is contained in a vessel and the relationship between the water level in the vessel and the amount of filter media is such that the media extends completely across the horizontal flow path of the water during the filtration mode of operation. The system is configured so that the buoyant media volume expands during a cleansing mode of operation.

16 Claims, 2 Drawing Sheets

FIG. 3
FIG. 4
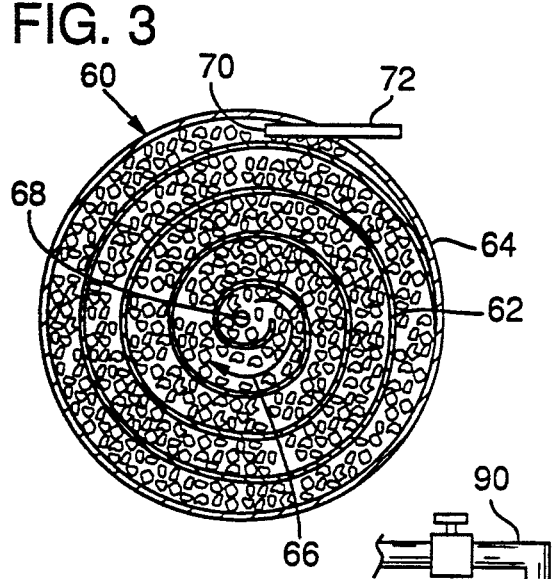
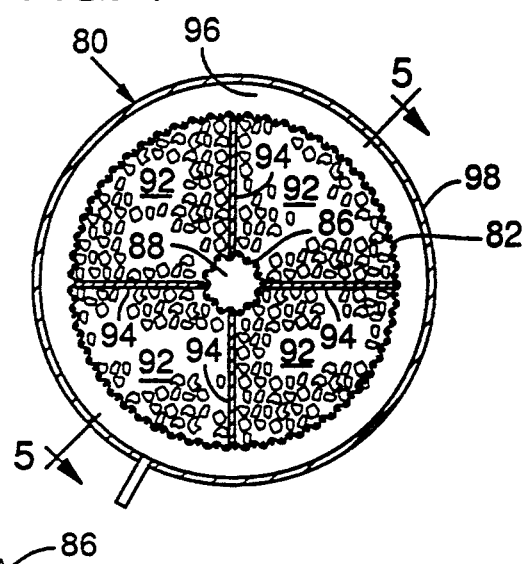
FIG. 5
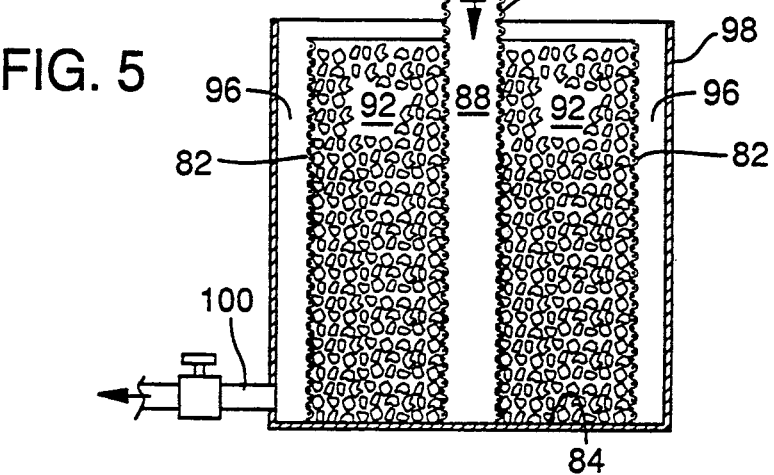
FIG. 6
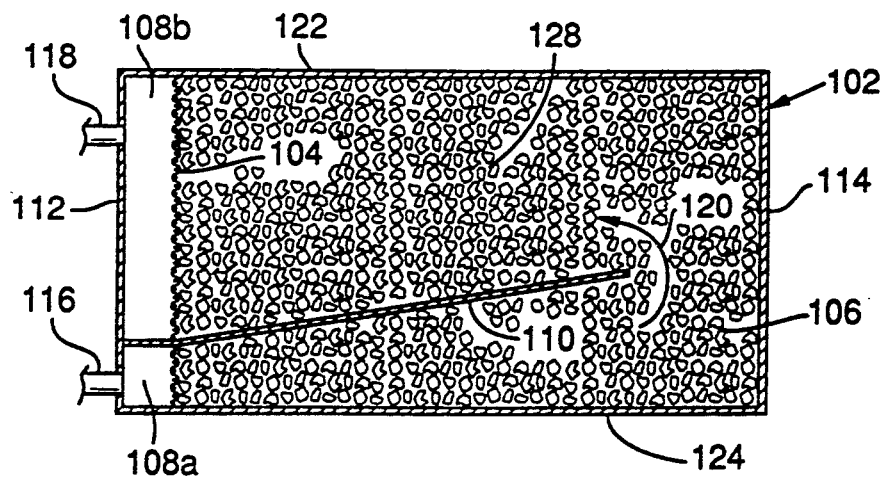

FILTRATION SYSTEM

TECHNICAL FIELD

This invention pertains to water or waste water filtration systems.

BACKGROUND INFORMATION

Water or waste water treatment methods often include the step of directing the water through a filter. The filter traps most of the solids that are suspended in the water. The filter is periodically cleaned to remove the trapped solids.

One type of filter is known as a floating bed or buoyant media filter. Such a filter comprises buoyant particles that are contained within a vessel. The unfiltered water is directed to flow upwardly through the particles.

Buoyant media filters can be easily cleaned. In this regard, the buoyant media may be dispersed and agitated by a backflow of water into the vessel or by the introduction of gas bubbles into the liquid-filled vessel. Dispersion and agitation of the filter media releases the trapped solids. The released solids settle to the bottom of the vessel and are removed from the vessel through a drain. After completion of the filter-cleansing mode of operation, the buoyant media floats back into position at the surface of the liquid in the vessel.

The effectiveness of a filter is primarily a function of the length of the flow path of the water through the filter. More particularly, the filter performance (measured, for example, as the percentage of solids removed from the water) increases with the length of the flow path through the filter media. Accordingly, the filter performance of buoyant media filters is increased by increasing the depth of the media through which the water vertically flows.

Increasing the flow path of any vertical-flow filter substantially increases the cost and complexity of the filtration system because of the need for constructing a vessel that is suitable for supporting a deep column of liquid and filter media.

SUMMARY OF THE INVENTION

This invention is directed to a filtration system that provides a long flow path through buoyant filter media. The cost of providing such a long flow path is minimized because the path is directed through the filter vessel in a generally horizontal direction. As a result, the need to construct a deep filter vessel is obviated. Moreover, existing water treatment vessels, such as settling tanks, may be readily converted into a horizontal-flow filtration system of the present invention.

The filtration system particularly comprises a filter vessel that includes a bottom wall and side walls. An influent conduit and an effluent conduit are connected to the vessel to provide substantially horizontal flow of the water through the vessel. The system is operable in a filtration mode for filtering water, and in a cleansing mode for cleaning the filter.

The level of the water in the vessel is controlled so that the buoyant filter media extends completely across the horizontal flow path of the water during the filtration mode of operation. Put another way, the amount of buoyant filter media carried in the vessel is sufficient to ensure that, during the filtration mode, the weight of the media keeps the media against the vessel bottom wall so that water cannot bypass the filter media as it flows through the vessel.

The vessel that contains the buoyant filter media is constructed to permit periodic floating and dispersion of the media for the purpose of cleansing the filter media.

As another aspect of this invention, the system may be configured so that the water moves through the filter with gradually decreasing flow speed. Such a gradually reduced flow speed through the filter is desirable because the fine solids in the water are more effectively removed and retained by the filter media at reduced flow rates.

BRIEF DESCRIPTION OF THE DRAWINGS

FIG. 1 shows the system as it appears during the filtration mode of operation.

FIG. 2 shows the system as it appears during the filter-cleansing mode of operation.

FIG. 3 is a diagram, in plan, of a filtration system that is constructed from an existing, circular settling tank. The system of this embodiment has a very long flow path.

FIG. 4 is a diagram, in plan, of a filtration system that is constructed from an existing settling tank. The system of this embodiment is configured to define several flow paths along which paths the flow rate through the filter decreases for improved filtering.

FIG. 5 is a diagram of a section taken along line 5—5 of FIG. 4.

FIG. 6 is a diagram, in plan, of a filtration system that is constructed, from an existing rectangular-shaped tank.

DETAILED DESCRIPTION OF PREFERRED EMBODIMENTS

Figure 1:
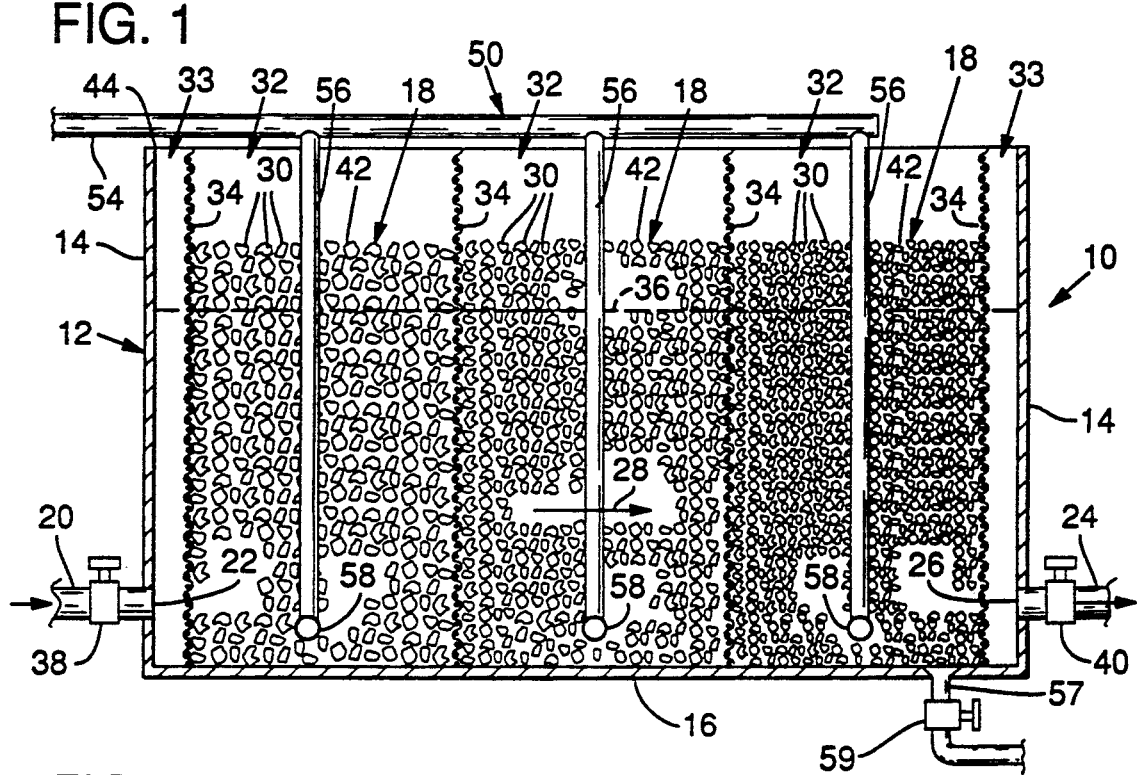
FIG. 1 is a diagram, in cross-section, of a filtration system that is formed in accordance with the present invention.

FIG. 1 depicts the filtration system 10 of the present invention as the system appears during the filtration mode of operation. The system 10 includes a vessel 12 having side walls 14 and a bottom wall 16. The vessel 12 is partly filled with buoyant filter media 18. An influent conduit 20 directs unfiltered or waste water through an inlet orifice 22 in one side wall 14 of the vessel 12. An effluent conduit 24 directs the filtered water out of the vessel 12 through an outlet orifice 26. The inlet orifice 22 and outlet orifice 26 are arranged so that the flow path (depicted as arrow 28 in FIGS. 1 and 2) of the water within the vessel 12 is generally horizontal.

The buoyant filter media 18 comprises a multitude of discrete particles 30 formed of durable material, such as polyethylene pellets. The average density of the filter particles 30 is less than that of the liquid that is directed through the vessel 12. Preferably, the filter particles 30 have a specific gravity of between about 0.8 and 1.0. It is contemplated, however, that the term "buoyant" also includes any media having a specific gravity low enough to permit the media to disperse in a generally upward direction whenever the filter is operated in the filter cleansing mode described below.

The configuration of the filter media particles 30 is selected for most effective filtering of the water type that is directed through the vessel 12. For example, the particles 30 should have an effective size between about 2 and 20 millimeters for potable water filtering operations. The particles 30 should have a uniformity coefficient preferably no greater than 2.0 and a sphericity of preferably less than 0.7.

Preferably, the vessel 12 is divided into filter compartments 32 and end compartments 33, 35. The filter compartments 32 are defined by perforated partitions, such as the screens 34 shown in FIGS. 1 and 2. Each filter compartment 32 is filled with buoyant particles 30 that are generally smaller than the particles carried in the adjacent compartment that is nearer the inlet orifice 22. As a result, the voids in the filter media 18 become gradually smaller in the direction from the inlet orifice 22 to the outlet orifice 26 of the vessel 12. This coarse-to-fine filtration technique provides optimal removal of solids from the water.

One end compartment 33 is located between the inlet orifice 22 and the adjacent filter compartment 32. That end compartment 33 contains no filter media and functions to dissipate and distribute the influent across the filter media 18 that is held in the filter compartments 32. The other end compartment 35, which is also free of filter media, collects the effluent that is directed from the system through the outlet orifice 26.

In accordance with the present invention, the water level (depicted as dashed line 36) in the vessel 12 during the filtration mode is controlled by adjusting the influent flow rate via inlet valve 38, and the effluent flow rate via outlet valve 40. In accordance with the present invention, the water level 36 in the vessel during the filtration mode is established so that, despite the buoyancy of the filter media 18, the particles 30 extend from the water surface 36 to the bottom wall 16 of the vessel 12 (FIG. 1). Accordingly, between the inlet orifice 22 and the outlet orifice 26 there is no flow path along which water may move through the filter compartments 32 without encountering the filter media 18. In this regard, the water level 36 is adjusted so that the weight of the filter media 18 in any compartment 32 is slightly greater than the buoyant force acting on the media 18. As a result, contact between the media 18 and the vessel bottom wall 16 is ensured. Consequently, the water level 36 will be substantially beneath the top surface 42 of the filter media 18 during the filtration mode.

In instances where the water level 36 is not easily controlled, or the level varies during the filtration mode, the amount of filter media 18 carried in any compartment 32 should be sufficient to ensure that the media-to-bottom wall contact mentioned above is maintained during the time that the water is at the maximum level. Moreover, the relationship between the amount of filter media 18 and the water level 36 should be such that the weight of the media is sufficient for compressing the media particles 30 together so that the voids between those particles 30 are small enough for effective filtering at any level in the vessel 12.

Figure 2:
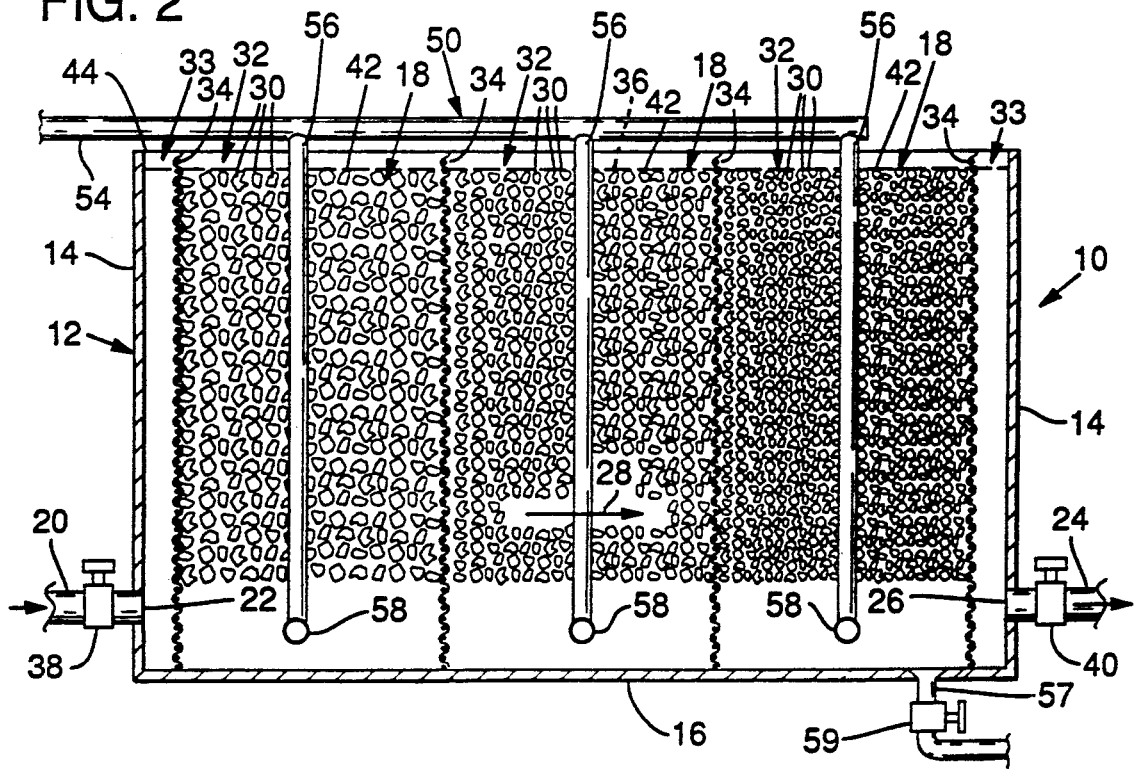
FIG. 2 is a diagram, in cross-section, of the filtration system of FIG. 1.

The filtration system 10 of the present invention is configured to take advantage of the efficient filter-cleansing techniques that may be employed with buoyant filter media. The filter cleansing mode is depicted in FIG. 2.

As a preliminary step in cleansing the filter media 18, the water level 36 in the vessel 12 is raised (for example, by closing outlet valve 40) to a level (hereafter referred to as the cleansing level) near the top 44 of the vessel 12. This cleansing level 36 (FIG. 2) is sufficient to allow all of the filter media 18 to float and to be dispersed in the vertical direction under the influence of the air-scouring mechanism described below. Once the water level reaches the cleansing level, the inlet valve 38 is closed so that the cleansing level is maintained throughout the cleansing mode.

An air-scouring mechanism 50 is employed for dispersing air (or other suitable gas) bubbles throughout the liquid in the vessel 12. The amount of air provided is selected to be sufficient to reduce the density of the fluid within the vessel to below the density of the particles 30 that make up the media 18 so that at least some of the media particles 30 descend by gravity, thereby expanding the overall volume of the filter media 18. As the filter media volume increases, particles 30 slightly separate from one another, allowing trapped solids to move from the filter media 18 and to settle on the bottom wall 16 of the vessel 12.

The air-scouring mechanism 50 includes a feeder pipe 54 for delivering pressurized air through headers 56 that terminate in bubble tubes 58. At least one bubble tube 58 is located in each filter compartment 32 of the vessel 12. Preferably, the bubble tubes 58 extend in a direction that is perpendicular to the direction of the flow path 28 (hence, the tubes 58 appear as circles in FIGS. 1 and 2), and the feeder pipe 54 is located above the vessel so that water in the vessel will not flow back into the feeder pipe 54. When air is introduced into the feeder tube 54, air bubbles are produced at the numerous orifices located in the bubble tubes 58 so that, during the cleansing mode, the fluid within the vessel 12 is an air-water mixture.

By dispersing bubbles of air throughout the fluid in the vessel 12, filter media expansion is substantially uniform at each horizontal cross-section of the vessel 12. Solids or other impurities that are released from the media 18 during the cleansing mode are drawn off through a drain 57, which may be opened and closed via valve 59.

It is contemplated that any of a number of mechanisms may be employed to accomplish the buoyant filter media cleansing mode just described.

After the cleansing mode is complete, the drain valve 59 is closed and the inlet valve 38 and outlet valve 40 are adjusted to resume normal horizontal flow through the vessel 12 so that the filtration system is returned to the filtration mode.

It is contemplated that the vessel 12 may have any of a variety of configurations. For example, the vessel may be constructed by converting an existing structure, such as a settling tank, into a configuration that provides, in accordance with the present invention, a long horizontal flow path of the water in the vessel. In this regard, FIG. 3 depicts, in top plan view, a diagram of a conventional, round settling tank 60 that has been converted for use as the present filtration system by installation of a continuous side wall 62 that spirals outwardly from the center of the tank 60 to the peripheral wall 64 of the tank. The spiral side wall 62 defines a long, spiral flow path indicated by arrow 66. The inlet orifice 68 is located at the tank center. The outlet orifice 70 and associated effluent conduit 72 are installed near the outer terminus of the spiral flow path 66 that is defined by the side wall 62.

Between the inlet orifice 68 and the outlet orifice 70, the water flows in a generally horizontal path. The tank 60 is partly filled with buoyant filter media 77 and the filtering and cleansing water levels are established as described above. Moreover, a suitable air-scrubber mechanism may be installed to accomplish the filter-media cleansing discussed earlier.

It can be appreciated that the configuration shown in FIG. 3 provides a very long flow path (hence, a very effective filter) without the need for providing a vessel that is deeper than the conventional settling tank 60.

FIGS. 4 and 5 illustrate another version of a filter vessel of the present invention constructed by converting an existing structure. In this regard a conventional, round settling tank 80 is modified to include a circular (in plan) outer screen wall 82 located within the tank and extending upwardly from the tank bottom 84. An inner screen wall 86 having a circular cross section is located at the center of the tank 80. The inner screen wall 86 extends upwardly from the tank bottom 84. The inner screen wall 86 defines an inlet chamber 88 into which is directed influent via inlet conduit 90.

The filter vessel that is defined between the inner screen wall 86 and the outer screen wall 82 is divided into several (for example, four) generally pie-shaped sectors 92 by radially extending walls 94. The walls 94 are located between the inner screen wall 86 and outer screen wall 82. The annular chamber 96 between the outer screen wall 82 and the wall 98 of the tank 80 serves as an effluent collection chamber. The sectors 92 are each filled with buoyant filter media 97 and the filtering and cleansing levels are established as described above. Moveover, a suitable air-scrubber mechanism (not shown) may be installed to accomplish the filter-media cleansing described earlier. The filtered water that enters the collection chamber 96 is removed via effluent conduit 100.

The embodiment described with respect to FIGS. 4 and 5 provides, in addition to a horizontal flow path, a flow path that is configured to gradually reduce the flow rate of the water passing through each sector 92. More particularly, the relative position of the inlet conduit 90 and the outlet conduit 100 are such that the flow of water through the system is radially outwardly from the inlet chamber 88 to the collection chamber 96. The cross sectional area (i.e., in a vertical plane) of each sector 92 gradually increases in the radially outward direction. Accordingly, for a given volume of water flowing through a filter sector 92, the flow rate of the water gradually decreases from the inlet chamber 88 to the collection chamber 96. As mentioned earlier, this gradually reduced flow rate through the filter enhances the effectiveness of the solids removal by the filter media.

FIG. 6 depicts a rectangular (in plan) shaped existing structure, such as settling tank 102 that is converted into a buoyant-media, horizontal flow filtration system of the present invention. More particularly, the tank 102 is divided by a screen 104 into a filter chamber 106 and a relatively smaller-volume inlet/outlet chamber 108.

The tank 102 is further divided by a solid divider wall 110 that extends from one end wall 112 to a location near, but spaced away from, the other end wall 114 of the tank 102. The divider wall 110 divides the inlet/outlet chamber 108 into an inlet portion 108a and an outlet portion 108b. Influent is directed into the inlet portion 108a by an inlet conduit 116. Filtered water is removed from the outlet portion 108b by an outlet conduit 118. The divider wall 110 is angled to define through the filter chamber 106 a flow path (represented by arrow 120) that has a gradually increased cross section (i.e., in a vertical plane) to provide gradually decreased flow rate through the filter vessel 106.

As provided with earlier embodiments, the flow chamber 106 is partly filled with buoyant filter media 127 and the filtering and cleansing water levels are established as described above. Moreover, a suitable air-scrubber mechanism may be installed to accomplish the filter-media cleansing discussed early.

It is contemplated that the divider wall 110 may be orientated in ways to provide a horizontal flow path configuration other than that depicted in FIG. 6. For example, the divider wall 110 may be straight and parallel to the side walls 122, 124 of the tank 102. Where such a straight and parallel divider wall orientation is employed, the flow rate through the first sector 126 of the filter vessel 106 will match the flow rate through the second sector 128 of the filter vessel 106 if the divider wall is located equidistant from the side walls 122, 124. The flow rate through the second sector 128 of the filter vessel 106 can be reduced relative to the flow rate in the first part 126 of the filter vessel by placing the straight and parallel divider wall 110 relatively closer to the side wall 124 that is nearest the inlet conduit 116.

In the embodiments described above, the filtration system was depicted as a substantially stand-alone system. It is to be understood, however, that the filtration system of the present invention may be readily incorporated into any existing, multi-step treatment system. For example, a filter vessel constructed as described above may be assembled immediately adjacent to the vessels that provide pretreatment steps, such as flash-mixing and flocculation. It is contemplated, however, that the effective filtration provided by the system of the present invention will allow, in some applications, the elimination of some pre-treatment steps, such as flash-mixing and flocculation.

Although the invention has been shown and described in the context of a preferred embodiment, it will be apparent to those skilled in the art that changes and modifications may be made thereto without departing from the invention in its broader aspects. Accordingly, the appended claims are intended to cover all such changes and modifications as follows the spirit and scope of the invention.

I claim:

1. A filtration system, comprising:
a horizontal flow vessel having a bottom wall and a filter media resting on the bottom wall, the media having a top surface;
flow control means for moving liquid substantially horizontally through the media while the media rests on the bottom wall to filter the liquid without raising the liquid to a level above the top surface of the media.
wherein the media has a density less than the density of the liquid and is present in an amount such that the media rests on the bottom wall of the vessel throughout filtration, the vessel being sized to permit the liquid level to rise within the vessel above the first liquid level to enable the media to move away from the bottom wall.

2. The system of claim 1 further comprising cleansing means for periodically moving the media away from the bottom wall and expanding the media volume in the vertical direction by raising the liquid in the vessel to a second liquid level that is above the first liquid level.

3. The system of claim 2 wherein the cleansing means includes gas delivery tubes connected to the vessel for delivering gas bubbles to the liquid within the vessel.

4. The system of claim 1 wherein the filter media comprises discrete particles.

5. A filtration system, comprising:

a horizontal flow vessel having a bottom wall;

flow control means for moving liquid through the vessel in a generally horizontal direction and at a first liquid level above the bottom wall; and buoyant filter media disposed within the vessel between the bottom wall and the first liquid level, the media having a density less than the density of the liquid and resting on the bottom of the vessel during filtration, the vessel being sized to permit the liquid level to rise within the vessel above the first liquid level to enable the media to move away from the bottom wall, wherein the vessel includes wall members for defining a spiral path along which the liquid in the vessel is filtered.

6. The system of claim 5 wherein the spiral path is horizontal.

7. A filtration system, comprising:

a horizontal flow vessel having a bottom wall;

a flow control means for moving liquid through the vessel in a generally horizontal direction and at a first liquid level above the bottom wall; and buoyant filter media disposed within the vessel between the bottom wall and the first liquid level, the media having a density less than the density of the liquid and resting on the bottom of the vessel during filtration, the vessel being sized to permit the liquid level to rise within the vessel above the first liquid level to enable the media to move away from the bottom wall wherein the vessel includes wall members for defining a sector in the vessel in which filter media rests during filtration, the area of the sector measured substantially perpendicular to the flow of the liquid through the sector gradually increasing in the direction of the liquid flow.

8. A filtration system, comprising:

a horizontal flow vessel having a bottom wall;

flow control means for directing liquid through the vessel in a generally horizontal direction and at a first liquid level above the bottom wall; and filter media disposed within the vessel between the bottom wall and the first liquid level, the media resting on the bottom wall and having a density less than that of the liquid that flows through the vessel; and a wall mounted in the vessel to define a sector of filter media in the vessel, the wall being oriented so that the vertical cross section of the sector of filter media increases in the direction liquid flows in the sector.

9. The system of claim 8 wherein the vessel is generally circular in plan, and contains a plurality of walls oriented to define in plan a wedge-shaped sector.

10. The system of claim 8 wherein the vessel is generally rectangular in plan having substantially parallel side walls, the wall being oriented to extend at an angle between the side walls.

11. The system of claim 8 wherein the vessel is generally rectangular in plan having substantially parallel side walls, the divider being oriented to extend between the side walls nearer one side wall than the other side wall.

12. A method for filtering liquid, comprising the steps of:

providing filter media within a vessel having a bottom wall and an upper region, the media resting on the bottom wall and having a top media surface; and moving liquid substantially horizontally through the media to filter it, without raising the liquid to a level above the media surface, the media being present in an amount sufficient to maintain the filter media resting on the bottom wall during filtration, the media having a density less than the liquid.

13. The method of claim 12 further including the step of gradually reducing in the horizontal direction the flow rate of the liquid that is directed through the vessel.

14. The method of claim 12 wherein the containing step includes the step of defining within the vessel a sector having a gradually increased cross-sectional area in the direction of liquid flow through the vessel.

15. A method for filtering liquid, comprising the steps of:

providing filter media within a vessel having a bottom wall and an upper region, the media resting on the bottom wall and having a top media surface;

moving liquid substantially horizontally through the media to filter it, without raising the liquid to a level above the media surface, the media being present in an amount sufficient to maintain the filter media away from the upper region during filtration, the media having a density less than the liquid; and cleansing the media by introducing a sufficient amount of liquid into the vessel to raise the liquid to a level above the media surface that was present during filtering such that the lower density media is moved upwardly away from its resting position on the bottom wall by the rising liquid.

16. The method of claim 13 further comprising the step of scouring the media by introducing pressurized gas into the media during cleansing.

* * * * *